United States Patent [19]

Iwaki et al.

[11] Patent Number: 4,504,752

[45] Date of Patent: Mar. 12, 1985

[54] ONE PIECE MOLDED VOLTAGE REGULATOR AND BRUSH HOLDER UNIT

[75] Inventors: Yoshiyuki Iwaki, Himeji; Hideo Imori, Hyogo; Hitoshi Gotou, Himeji, all of Japan

[73] Assignee: Mitsubishi Denki Kabushiki Kaisha, Tokyo, Japan

[21] Appl. No.: 556,600

[22] Filed: Nov. 30, 1983

[30] Foreign Application Priority Data

Nov. 30, 1982 [JP] Japan .................. 57-182817[U]

[51] Int. Cl.³ .................................... H02K 13/00
[52] U.S. Cl. ...................... 310/68 R; 310/43; 310/239; 310/248
[58] Field of Search ............ 310/239, 42, 43, 248, 310/45, 71, 68 R, 68 D, 72; 322/28

[56] References Cited

U.S. PATENT DOCUMENTS

| 3,496,394 | 2/1970 | Balcke | 310/68 R |
| 3,553,504 | 1/1971 | Balcke | 310/68 D |
| 3,586,892 | 6/1971 | Sato | 310/68 R |
| 3,588,617 | 6/1971 | Grozinger | 322/28 |
| 4,100,440 | 7/1978 | Binder | 310/68 D |
| 4,128,801 | 12/1978 | Gansert | 322/28 |
| 4,197,473 | 4/1980 | Allport | 310/239 |
| 4,359,656 | 11/1982 | Fasterding | 310/239 |
| 4,363,983 | 12/1982 | Frister | 310/68 R |

FOREIGN PATENT DOCUMENTS 246275  4/1966  Austria .................. 310/68 R

Primary Examiner—R. Skudy
Attorney, Agent, or Firm—Oblon, Fisher, Spivak, McClelland & Maier

[57] ABSTRACT

A brush holder for a charging generator for a car comprises a one-piece resin-molded body in which a pair of recesses for holding brushes are formed and a plurality of terminal plates are embedded except for small exposed parts to which lead wires of a voltage regulator and lead wires of said brushes are soldered. A brush is disposed in each of the recesses, and each of the brushes is connected to one of the lead wires which is also connected to a corresponding one of the terminals.

1 Claim, 5 Drawing Figures

ONE PIECE MOLDED VOLTAGE REGULATOR AND BRUSH HOLDER UNIT

BACKGROUND OF THE INVENTION

1. Field of the Invention

The present invention relates to a brush holder used mainly for a charging generator for a car. More particularly, it relates to an improvement in brush holder provided with an electronic voltage regulator.

2. Description of the Prior Art

FIG. 1 is a longitudinally cross-sectional view of the conventional generator of this type and FIG. 2 is a slant view of a brush holder used for the generator. In FIG. 1, the reference numeral 1 designates a brush holder and the reference numeral 2 designates a molded body. In FIG. 2, reference numerals, 4, 5 and 6 designate terminals, 7 designates a voltage regulator and 8 designate brushes.

The terminals 3, 4, 5 and 6 are fitted to the molded body 2 formed in one piece and the voltage regulator 7 is fitted into a recess 2a formed at the upper part of the molded body 2. Each of the connecting parts 9, 10, 11 and 12 of the terminals is connected to each of the connecting parts 13, 14, 15 and 16 of the voltage regulator by soldering. The lead wires 17 of the brushes 8 are respectively connected to specified connecting parts 18, 19 of the terminals.

In the conventional brush holder 1 constructed as above-mentioned, since the terminals 3, 4, 5 and 6 are exposed, there may occur a short-circuit between adjacent terminals by entrance of a metallic foreign substance or electrical corrosion by entrance of salt water.

SUMMARY OF THE INVENTION

It is an object of the present invention to overcome the disadvantage of the conventional brush holder and to provide an improved brush holder reducing risk of short-circuit or electrical corrosion.

The foregoing and other objects of the present invention have been attained by providing a brush holder which comprises a one-piece resin-molded body in which a pair of recesses for holding brushes are formed and a plurality of terminal plates are embedded except for exposed parts of the terminal plates to which lead wires of the voltage regulator and lead wires of the brushes are soldered.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
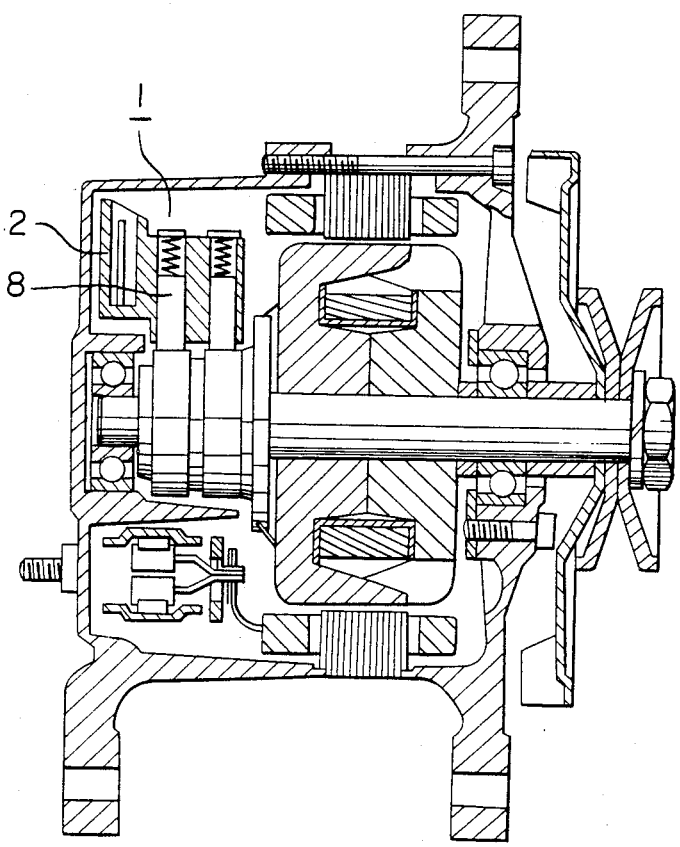
FIG. 1 is a longitudinally cross-sectional view of a conventional generator.
Figure 2:
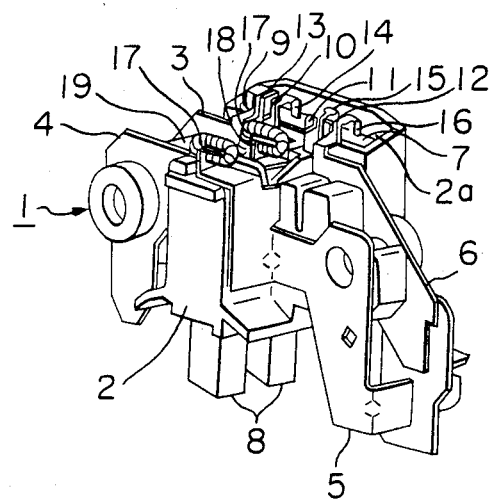
FIG. 2 is a slant view of a conventional brush holder.
Figure 3:
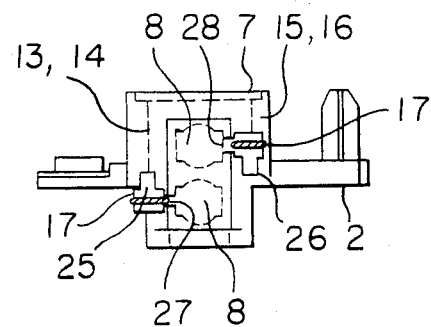
FIG. 3 is a plan view of an embodiment of the brush holder of the present invention.

As embodiment of the present invention will be described with reference to FIGS. 3 to 5.

Figure 4:
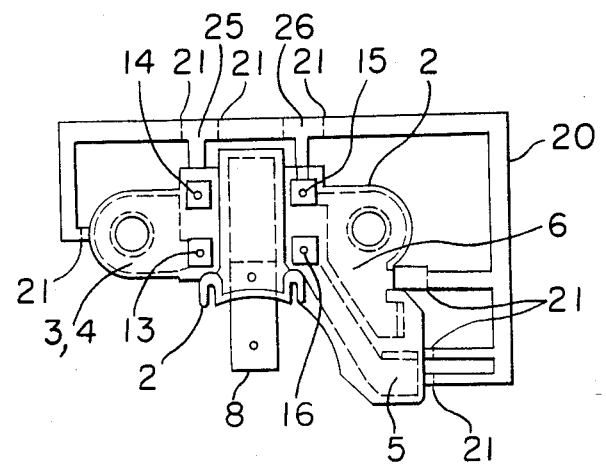
FIG. 4 is a front view of the brush holder of the present invention illustrating that a portion of a flat slim plate is not subjected to trimming operation.
Figure 5:
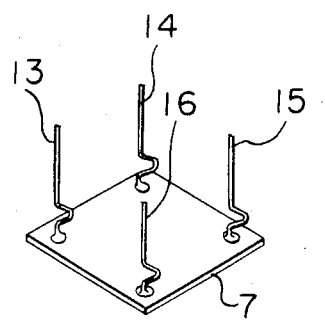
FIG. 5 is a slant view of a voltage regulator which can be used in the present invention.

First of all, a one-piece resin-molded body 2 is formed in a shape as shown in the plan view of FIG. 4. The terminals 3, 4, 5 and 6 are embedded in the molded body 2 except for four square openings or exposed parts. The terminals 3, 4, 5 and 6 before being trimmed are connected in one-piece by means of flat slim plate 20. The one-piece structure of the terminals renders resin-molding easy because the terminals are immovable in a mold. The terminals held in one-piece are embedded between a pair of recesses 27, 28 for holding the brushes 8 in the molded body 2.

Then the terminals connected in one-piece are separated by cutting parts of the flat slim plate 20 at cutting lines 21. Thus, the terminals 3, 4, 5 and 6 are covered in the molded body except for minimum parts for connection to the lead wires of the voltage regulator 7 and the brushes 8. Specifically, the lead wires 13, 14, 15 and 16 respectively extending from the four corners of the flatened square voltage regulator 7 are respectively soldered to the respective square exposed parts as shown in FIG. 4. The lead wires 17 of the brushes 8 are respectively connected to the other exposed parts 25, 26 which are left in trimming of the flat slim plate 20. The exposed parts 25, 26 are bent in the direction opposite each other, namely, the exposed part 25 is bent downwards and the exposed part 26 is bent upwards respectively, as shown in FIG. 3, so that they face each of the recesses 27 and 28 for holding the brushes 8.

The brush holder of the present invention is constructed as above-mentioned. Since the terminal plates are covered with resinous material except for very small exposed parts required for connection occurrence of a short-circuit between the terminals and electrical corrosion caused by salt water are greatly reduced. Further, the disadvantage of the conventional device that there were a number of bending steps required to prepare the terminal is overcome by the present invention, in which the terminal undergoes punching steps while in a flat state. Accordingly, utilization efficiency of the material increases.

What is claimed is:

1. A one piece molded voltage regulator and brush holder unit comprising:
   (a) a one piece resin-molded body;
   (b) a flat, square electronic voltage regulator embedded in said one piece resin-molded body with four lead wires projecting from the four corners of said electronic voltage regulator into said one piece molded body;
   (c) four terminals embedded in said one piece resin-molded body except for a small exposed part on each of said terminals, said terminals being embedded between a pair of recesses for holding brushes;
   (d) a brush disposed in each of said recesses, each of said brushes being connected to one of said lead wires which is also connected to a corresponding one of said terminals;
   (e) each of said four lead wires which project from said electronic voltage regulator being connected to a corresponding one of said four terminals; and
   (f) the exposed parts of said terminals being shaped so that they face said recesses for holding brushes.

* * * * *